United States Patent [19]
Tokushima et al.

[11] Patent Number: 5,821,655
[45] Date of Patent: Oct. 13, 1998

[54] MAGNETIC FLUID BEARING UNIT STRUCTURE AND MOTOR HAVING THE SAME

[75] Inventors: Hidekazu Tokushima, Matsudo; Motohiro Miyasaka, Nagareyama; Michihiro Aizawa; Hideo Shikata, both of Matsudo; Katsutoshi Nii, Hitachi, all of Japan

[73] Assignees: Hitachi, Ltd.; Hitachi Powdered Metals Co., Ltd., both of Tokyo, Japan

[21] Appl. No.: 786,964

[22] Filed: Jan. 24, 1997

[30] Foreign Application Priority Data

Jan. 30, 1996 [JP] Japan .................................. 8-013766

[51] Int. Cl.$^6$ .............................. H02K 5/16; F16C 32/06
[52] U.S. Cl. ............................................. 310/90; 384/114
[58] Field of Search ...................... 310/90, 90.5; 384/99, 384/100, 114

[56] References Cited

U.S. PATENT DOCUMENTS

| | | | |
|---|---|---|---|
| 3,612,630 | 10/1971 | Rosensweig | 310/90.5 |
| 3,734,578 | 5/1973 | Rosensweig | 310/90.5 |
| 3,746,407 | 7/1973 | Stiles et al. | 310/90.5 |
| 4,254,961 | 3/1981 | Fersht et al. | 310/90.5 |
| 4,694,213 | 9/1987 | Gowda et al. | 310/90 |
| 5,108,198 | 4/1992 | Nii et al. | 384/133 |
| 5,161,900 | 11/1992 | Bougathou et al. | 384/133 |
| 5,280,208 | 1/1994 | Komura et al. | 310/90 |
| 5,399,025 | 3/1995 | Higuchi et al. | 310/90 |
| 5,447,774 | 9/1995 | Tanaka et al. | 384/913 |
| 5,541,462 | 7/1996 | Nii et al. | 310/90 |
| 5,574,322 | 11/1996 | Nii et al. | 310/90.5 |
| 5,645,355 | 7/1997 | Tokushima et al. | 384/133 |
| 5,667,308 | 9/1997 | Nose et al. | 384/99 |
| 5,675,199 | 10/1997 | Miyakoshi et al. | 310/90 |

Primary Examiner—Clayton E. LaBalle
Attorney, Agent, or Firm—Antonelli, Terry, Stout & Kraus, LLP

[57] ABSTRACT

A magnetic fluid bearing unit has a bearing housing, a bearing member having magnetic fluid as a lubricating agent, a rotary body rotatively supported by the bearing member, an upper permanent magnet arranged inside the bearing housing, and a lower permanent magnet arranged inside the bearing housing, the bearing member being sandwiched by the upper permanent magnet and the lower permanent magnet. The bearing member is a radial porous oil-containing bearing member in which the magnetic fluid is impregnated. The upper permanent magnet is set to have one direction of magnetic pole orientation, and the lower permanent magnet is set to have the same direction of magnetic pole orientation as the upper permanent magnet. The bearing member is sandwiched by the upper permanent magnet and the lower permanent magnet to confine the magnetic fluid. Over a wide range of rotation speeds, the leakage and the scattering of the magnetic fluid from the bearing unit can be prevented. The bearing unit for a compact size motor having a high rotation accuracy can be obtained.

16 Claims, 2 Drawing Sheets

MAGNETIC FLUID BEARING UNIT STRUCTURE AND MOTOR HAVING THE SAME

BACKGROUND OF THE INVENTION

The present invention relates to a magnetic fluid bearing unit and a motor having such a magnetic fluid bearing unit, and, more particularly, to a magnetic fluid bearing unit including a radial sliding bearing member using a magnetic fluid as a lubricating agent and a motor having such a magnetic fluid bearing unit.

The present invention relates to a magnetic fluid bearing unit including a radial sliding bearing member suitable for use in a motor of the type which may be used, for example, in an audio apparatus in which silent operation, high speed and high accuracy of rotation are required, and a motor having such a magnetic fluid bearing unit.

A bearing unit for a compact size motor, such as used for an audio apparatus, a video apparatus, a laser beam printer, a magnetic disc apparatus or an air conditioning apparatus, typically employs a ball bearing member or a sliding bearing member in which air or oil is used as a lubricating agent. Further, in addition to high performance, a compact size and a multi-functioning capability, the motor used in these types of machines and apparatuses requires a bearing unit having a high speed capability and a high accuracy of rotation.

As to the high speed capability of such a motor, progress has been made, for example, in providing a video tape recorder (VTR) having a cylinder motor whose rotational speed is 1800–10000 rpm, a laser scanning polygon mirror motor having a rotational speed of several thousands— several ten thousands rpm, and a magnetic disc drive spindle motor having a rotational speed of is 3600–10000 rpm.

However, for the above stated motors, there also is a strong demand for high accuracy of rotation (no bearing run-out) in addition to a high speed capability. Unfortunately, at the above stated high rotation speeds, it is difficult to provide a ball bearing unit which will also exhibit the required high accuracy of rotation. As a result, a sliding bearing unit in which air or oil are used as the lubricating agent has been employed.

A sliding bearing member where oil is used as the lubricating agent has a superior bearing rigidity characteristic and a superior dumping characteristic as compared to a sliding bearing member where air is used as the lubricating agent. Therefore, the sliding bearing member becomes effective to form a compact size bearing unit and also to provide a high accuracy of rotation. Further, from the aspect of the manufacturing cost for the sliding bearing unit, as a material for the sliding bearing member, a sintered oil-containing bearing member having a superior manufacturing productivity and a low cost of manufacture is used frequently. However, in the sliding bearing unit, oil leakage from the bearing member portion cannot be tolerated, and with respect to the oil seal, in particular, there is a strict demand for a high sealing performance.

Recently, to solve the above stated problems, a magnetic fluid bearing unit has been proposed wherein a magnetic fluid is utilized for the required lubrication and also to facilitate the sealing of the bearing unit. Such a magnetic fluid bearing unit is disclosed in, for example, Japanese patent laid-open publication No. 143,863/1978 and Japanese patent laid-open publication No. 63,220/1995.

In a magnetic fluid bearing unit, the magnetic fluid used for lubricating is supplied to a bearing sliding portion of the bearing member to be lubricated, and this magnetic fluid is held in the bearing member through the use of ring-like permanent magnets. The magnetic fluid bearing unit disclosed in Japanese patent laid-open publication No. 143, 863/1978 has ring-like permanent magnets disposed between the bearing members, and the magnetic fluid is supplied to a bearing sliding face of the bearing member where it is held by the magnetic force of the permanent magnets. In this magnetic fluid bearing unit, during the starting and stopping of rotation and at low rotational speeds of the motor, the magnetic fluid is effectively held on the bearing sliding face of the bearing member. However, at high rotational speeds, since a significant centrifugal force acts on the magnetic fluid, there is the possibility that the magnetic fluid will be driven away from the bearing sliding face and scattered. In Japanese patent laid-open publication No. 143,863/1978, no consideration has been given to prevention of the scattering of the magnetic fluid during high speed operation.

In the magnetic fluid bearing unit disclosed in Japanese patent laid-open publication No. 63,220/1995, a magnetic fluid seal is provided at a releasing end portion of the bearing unit structure, and this bearing unit structure is filled with a magnetic fluid. Accordingly, the magnetic fluid is secured fully in the bearing member portion, and a high accuracy of rotation is maintained in combination with effective lubrication. However, in the case where the magnetic fluid bearing unit is fully filled with magnetic fluid, during the high speed rotation, the magnetic fluid is volumetrically expanded by the thermal heat of the bearing member portion. As a result, the magnetic fluid may leak from the magnetic fluid sealing portion, and since a significant centrifugal force acts on the magnetic fluid at the sealing portion, there is the possibility of scattering of the magnetic fluid. In Japanese patent laid-open publication No. 63,220/ 1995, no consideration has been given to prevention of the scattering of the magnetic fluid during high speed operation.

Further, in general, there are many motor structures having a shaft rotation system employing a magnetic fluid bearing structure. For example, in a case where it is necessary to increase the load supporting rigidity, one may employ a motor structure comprised of a bearing rotation system having a magnetic fluid bearing structure. In such case, to adopt the use of a sliding bearing member, since centrifugal force acts on the lubricating oil at the bearing sliding face of the bearing member, there is the possibility of running short of oil. Therefore, it is necessary to constitute the magnetic fluid bearing unit in such a way that the lubricating oil can be supplied reliably to the sliding face of the bearing member. However, in a bearing rotation system magnetic fluid bearing unit using a sliding bearing member, no consideration has been given to the oil supplying system and to the prevention of scattering of the lubricating oil.

As a magnetic fluid, it is known to use a fluid which is comprised of ferromagnetism micro particles and lubricating oil.

SUMMARY OF THE INVENTION

An object of the present invention is to provide a magnetic fluid bearing unit wherein leakage of magnetic fluid from the bearing unit can be prevented over a wide rotational range of speeds from a low speed of rotation to a high speed of rotation.

Another object of the present invention is to provide a magnetic fluid bearing unit wherein scattering of magnetic fluid from the bearing unit can be prevented over a wide rotational range of speeds from a low speed of rotation to a high speed of rotation.

A further object of the present invention is to provide a magnetic fluid bearing unit wherein high accuracy of rotation of the bearing unit can be maintained over a wide rotational range of speeds from a low speed of rotation to a high speed of rotation.

A further object of the present invention is to provide a motor having a magnetic fluid bearing unit wherein leakage and scattering of magnetic fluid from the bearing unit can be prevented over a wide rotational range of speeds from a low speed of rotation to a high speed of rotation.

A further object of the present invention is to provide a motor having a magnetic fluid bearing unit wherein high accuracy of rotation of a bearing unit can be maintained over a wide rotational range of speeds from a low speed of rotation to a high speed of rotation.

According to the present invention, a magnetic fluid bearing unit comprises a non-magnetic bearing housing, and a radial sliding bearing member mounted on the non-magnetic bearing housing and having magnetic fluid as a lubricating agent.

The magnetic fluid bearing unit has the further feature that the radial sliding bearing member is arranged in an interior portion of the non-magnetic bearing housing, a first ring-like permanent magnet is arranged in the interior portion of the non-magnetic bearing housing, a second ring-like permanent magnet is arranged in the interior portion of the non-magnetic bearing housing, and the radial sliding bearing member is sandwiched by the first ring-like permanent magnet and the second ring-like permanent magnet.

The radial sliding bearing member is a radial porous oil-containing sintered bearing member in which magnetic fluid is impregnated, the first ring-like permanent magnet is set to have one direction of magnetic orientation, and the second ring-like permanent magnet is set to have same direction of magnetic orientation as that of the first ring-like permanent magnet. Thereby, the radial sliding bearing member is sandwiched by the first ring-like permanent magnet and the second ring-like permanent magnet to hold the magnetic fluid in the radial porous oil-containing sintered bearing member.

According to the present invention, a motor having a magnetic fluid bearing unit comprises a stator, a rotor, a motor housing, a permeable shaft mounted on the motor housing, a non-magnetic bearing housing, and a radial sliding bearing member mounted on the non-magnetic bearing housing and having magnetic fluid as a lubricating agent.

The motor having such a magnetic fluid being unit further has the feature wherein the radial sliding bearing member is arranged in an interior portion of the non-magnetic bearing housing surrounding the motor shaft, a first ring-like permanent magnet is arranged in the interior portion of the non-magnetic bearing housing surrounding the motor shaft, a second ring-like permanent magnet is arranged in the interior portion of the non-magnetic bearing housing surrounding the motor shaft, and the radial sliding bearing member is sandwiched by the first ring-like permanent magnet and the second ring-like permanent magnet.

The radial sliding bearing member is a radial porous oil-containing sintered bearing member in which magnetic fluid is impregnated, the first ring-like permanent magnet is set to have one direction of magnetic orientation, and the second ring-like permanent magnet is set to have same direction of magnetic orientation as that of the first ring-like permanent magnet. Thereby, the radial sliding bearing member is sandwiched by the first ring-like permanent magnet and the second ring-like permanent magnet to hold the magnetic fluid in the radial porous oil-containing sintered bearing member.

To reduce speed variations during high speed rotation, the magnetic fluid bearing unit structure desirably has the above stated plural oil-containing sintered bearing members sandwiched by the ring-like permanent magnets. Further, in the magnetic fluid bearing unit structure according to the present invention, as the radial porous oil-containing sintered bearing member impregnated magnetic fluid, it is desirable to employ a bearing member having a specific low friction coefficient Fe—Cu system sintered body.

As a result, with the above stated bearing structure, the friction and abrasion during the starting and/or during the stopping of rotation can be reduced and a magnetic fluid bearing unit structure having a long service life can be attained.

DESCRIPTION OF THE INVENTION

Figure 1:
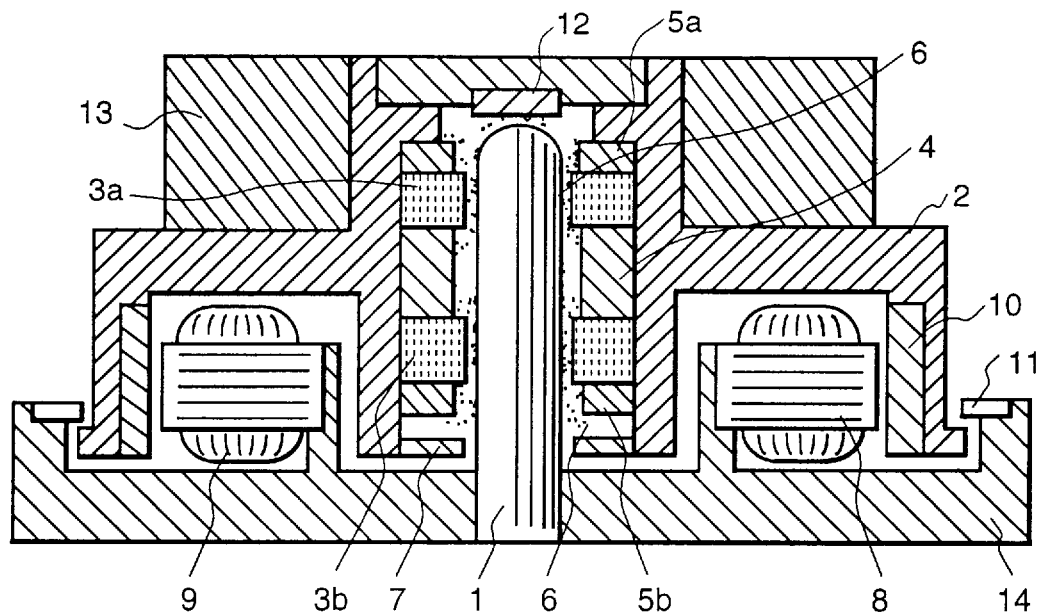
FIG. 1 is a longitudinal cross-sectional view showing a VTR cylinder motor using one embodiment of a magnetic fluid bearing unit according to the present invention.

A VTR cylinder motor using one embodiment of a magnetic fluid bearing unit according to the present invention will be explained with reference to the drawing.

Referring to FIG. 1, a vertical type VTR cylinder motor comprises a permeable fixed shaft 1, a non-magnetic bearing housing 2, an upper radial porous oil-containing sintered bearing member 3a, a lower radial porous oil-containing sintered bearing member 3b, a middle ring-like permanent magnet 4, an upper ring-like permanent magnet 5a, a lower ring-like permanent magnet 5b, magnetic fluid 6, and an end cover 7. The VTR cylinder motor further comprises a stator 8 of the motor, armature windings 9, a rotor 10 for driving the motor, a retaining member 11 for preventing the bearing housing 2 from slipping out, a thrust receiving member 12, a cylinder 13 serving as a load, and a motor housing 14.

The rotor 10 for driving the motor comprises a multi-pole magnetized ring-like permanent magnet. The rotor 10 for driving the motor and the cylinder 13 are mounted on the bearing housing 2. The thrust receiving member 12, the two upper and lower radial porous oil-containing sintered bearing members 3a and 3b, the middle ring-like permanent magnet 4, the two upper and lower ring-like permanent magnets 5a and 5b and the cover 7 are fitted into an interior portion of the bearing housing 2. The retaining member 11 of the bearing housing 2, the stator 8 of the motor, the armature windings 9 and the fixed shaft 1 are provided on the motor housing 14. The fixed shaft 1 extends through the two upper and lower radial bearing members 3a and 3b, and the bearing housing 2 is driven in rotation according to this motor construction.

In the above stated magnetic fluid bearing unit according to the present invention, a rotary body member is formed by the bearing housing 2, the upper and lower radial porous oil-containing sintered bearing members 3a and 3b, the middle ring-like permanent magnet 4, the two upper and lower ring-like permanent magnets 5a and 5b, the cover 7, the rotor 10, the thrust receiving member 12 and the cylinder 13. The bearing housing 2 and the cylinder 13 rotate while being supported on the permeable fixed shaft 1, which is mounted on the motor housing 14 so as to not rotate.

Herein, the construction of the magnetic fluid bearing unit structure forming this embodiment according to the present invention will be further explained.

The magnetic fluid 6 necessary to effect the required lubrication is impregnated under a vacuum condition in advance in the two upper and lower radial porous oil-containing sintered bearing members 3a and 3b, which are fitted into the interior portion of the bearing housing 2. Each of the upper and lower radial porous oil-containing sintered bearing members 3a and 3b is closely sandwiched by and adhesively fixed to each of the middle ring-like permanent magnet 4 and the two upper and lower ring-like permanent magnets 5a and 5b. The middle ring-like permanent magnet 4 and the two upper and lower ring-like permanent magnets 5a and 5b are set respectively to form a single direction of magnetic orientation. In other words, the direction of orientation of the magnetic poles of each of the middle ring-like permanent magnet 4 and the two upper and lower ring-like permanent magnets 5a and 5b is the same. The operation of the magnetic fluid bearing unit structure shown in FIG. 1 will be explained with reference to FIG. 2.

The magnetic fluid 6 impregnated in advance in the two upper and lower radial porous oil-containing sintered bearing members 3a and 3b comprises micro fine magnetic particles having a ferromagnetism property and a lubricating oil. This magnetic fluid 6 has a property of being attracted by the permanent magnets (the middle ring-like permanent magnet 4 and the two upper and lower ring-like permanent magnets 5a and 5b). As a result, the middle ring-like permanent magnet 4 and the two upper and lower ring-like permanent magnets 5a and 5b adhere to the two upper and lower radial porous oil-containing sintered bearing members 3a and 3b. In this case, the impregnated magnetic fluid 6 in the two upper and lower bearing members 3a and 3b is magnetized and is extracted from the two upper and lower radial porous oil-containing sintered bearing members 3a and 3b. Therefore, before the mounting of the two upper and lower radial porous oil-containing sintered bearing members 3a and 3b on the fixed shaft 1, a necessary amount of magnetic fluid 6 is impregnated in the two radial porous oil-containing sintered bearing members 3a and 3b in advance. In other words, the amount of the magnetic fluid 6 impregnated in the bearing members 3 and 3b takes into account the necessary amount of the magnetic fluid 6 to be extracted therefrom.

Figure 2:
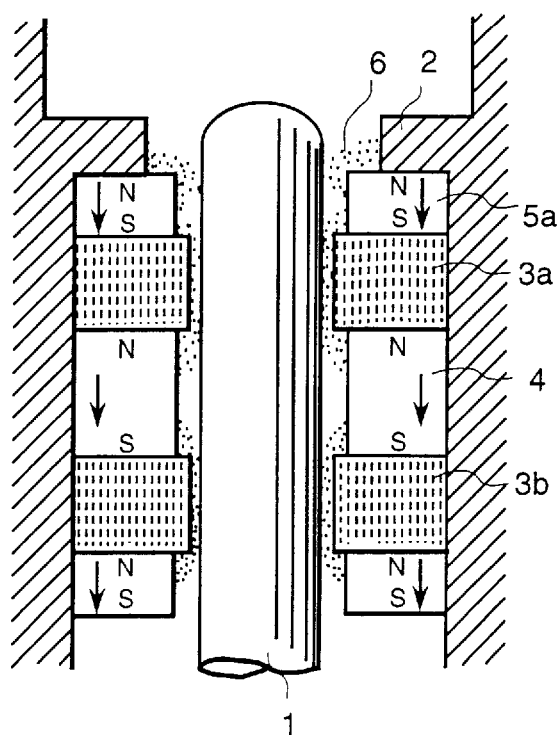
FIG. 2 is a diagrammatic view for explaining the operation of the magnetic fluid bearing unit shown in FIG. 1.

As shown in FIG. 2, the magnetic poles of the middle ring-like permanent magnet 4 and the two upper and lower ring-like permanent magnets 5a and 5b are aligned in the same direction, such as (N-S) - (N-S) - (N-S), substantially parallel to the axis of the fixed shaft 1. As a result, the micro fine particles of the magnetic fluid 6 of each of the two upper and lower bearing members 3a and 3b, are aligned to have the same magnetic pole direction shown by the arrows in FIG. 2. Further, the fixed shaft 1 is magnetized by the permanent magnets arranged in the magnetic fluid bearing unit, so that the magnetic fluid 6 is sucked toward a pivot portion at the tip end of the fixed shaft 1 which is positioned adjacent to the upper ring-like permanent magnet 5a. Accordingly, the magnetic fluid 6 lubricates a space surrounding the thrust receiving member 12.

With the above stated conditions, when the motor is rotated, the magnetic fluid 6 may scatter toward the bearing sliding faces of the two upper and lower radial porous oil-containing sintered bearing members 3a and 3b in response to the centrifugal force.

In this embodiment of the magnetic fluid bearing unit according to the present invention, the bearing unit comprises the two upper and lower radial porous oil-containing sintered bearing members 3a and 3b. Further, in this embodiment, the magnetic fluid 6 has been magnetized by the middle ring-like permanent magnet 4 and the two upper and lower ring-like permanent magnets 5a and 5b. Also, the middle ring-like permanent magnet 4 and the two upper and lower ring-like permanent magnets 5a and 5b are set to align the effective direction of the magnetic field generated by the poles so as to facilitate the holding of the magnetic fluid 6. Therefore, even through a centrifugal force acts on the magnetic fluid 6, the magnetic fluid 6 is prevented from flowing out of the interior portion of the magnetic fluid bearing unit by the magnetic suctioning force, and thereby the scattering of the magnetic fluid 6 can be greatly reduced.

Further, in the case where Fe system material is employed, as the material for the two upper and lower radial porous oil-containing sintered bearing members 3a and 3b, since the two bearing members 3a and 3b form magnetic paths, the magnetic fluid 6 which has impregnated the sintered bearing members 3a and 3b can be effectively magnetized. Also, with the use of a Fe—Cu system sintered bearing member, a further more superior sliding characteristic can be obtained.

The magnetic fluid bearing unit according to the present invention is sandwiched by the ring-like permanent magnets 4, 5a and 5b, which give a predetermined directional orientation to the magnetic fluid 6 of the porous oil-containing sintered bearing members 3a and 3b. As a result, according to this embodiment of the present invention, a magnetic fluid bearing unit having a reliable lubricating characteristic and a superior sealing characteristic can be obtained.

Further, according to the result of experiments using the above stated bearing rotation system in a motor by the inventors of the present invention, in the case of a high speed of rotation exceeding several thousands of rotations per minute, it has been found that there is a possibility that scattering of the magnetic fluid will occur when the magnetization strength is small or weak. To accommodate such operation in the high speed region, as the material for the middle ring-like permanent magnet 4 and the two upper and lower ring-like permanent magnets 5a and 5b, in place of a common ferrite magnet, a ferromagnetism rare earth metal system magnet, for example, a Samarium-Cobalt alloy magnet or a Neodymium-Iron-Boron alloy magnet, can be used. By use of a ferromagnetism rare earth metal system magnet, even with a high speed of rotation of about ten thousand rotations per minute, the scattering of the magnetic fluid 6 can be prevented and the magnetic fluid 6 will always reliably lubricate the bearing sliding face of the two upper and lower radial porous oil-containing bearing members 3a and 3b, and a good lubricating state can be maintained.

In a bearing rotation system of a motor where the use of a sliding bearing structure is difficult, according to the present invention, the magnetic pole direction of the ring-like permanent magnets 4, 5a and 5b are set toward the same direction. Since the magnetic fluid 6 is held reliably in the two upper and lower radial porous bearing members 3a and 3b, it is extremely effective to form a magnetic fluid bearing unit for high speed rotation and use in a compact size motor.

Next, an oil-containing sintered bearing member material suitable for the magnetic fluid bearing unit according to the present invention will be explained.

In a motor designed for high speed and high accuracy of rotation, the correction of an unbalanced state of the rotary body (for example, the bearing housing 2 and the cylinder 13, or an arrangement with a rotary shaft) is performed and the dynamic load acting on the magnetic fluid bearing unit is significantly reduced, thereby the motor can be used without the occurrence of shaft run-out. However, during practical use of the motor, when the amount of unbalance of the rotary body increases for some reason, the bearing load is increased, and the bearing member comprising Fe system material may be subjected to abrasion. Further, in a lateral type motor, (for example a motor structure wherein the motor shown in FIG. 1 is arranged on its side facing the left direction), the weight of the rotary body acts on the magnetic fluid bearing unit as a radial load, and so it is difficult to avoid abrasion caused by repeated starting and stopping of the motor.

In the magnetic fluid bearing unit according to the present invention, as the magnetic material for the bearing member, the characteristic of a Fe system sintered bearing member is utilized, and so a porous oil-containing sintered bearing member having a superior abrasion characteristic was found according to experimentation carried out by the inventors of the present invention. Namely, by maintaining the operations and the effects of the magnetic fluid bearing unit according to the present invention, and further by the employment of a Fe—Cu system sintered bearing member having the ability to withstand friction as well as a superior anti-abrasion characteristic, the above stated problems can be solved.

Figure 3:
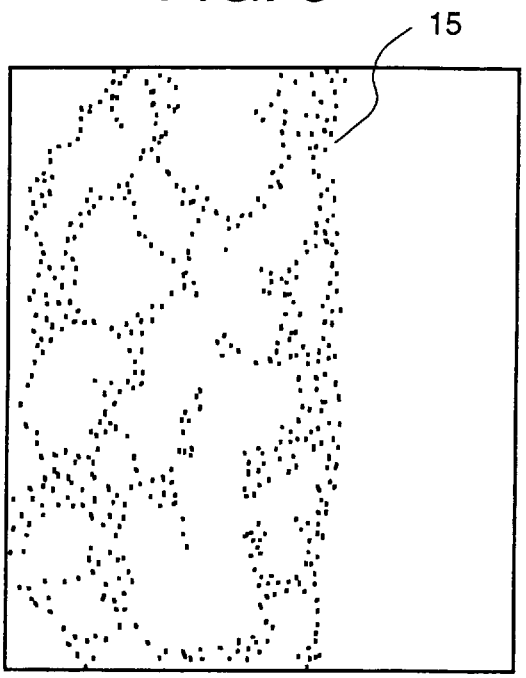
FIG. 3 is a view showing a cross-sectional Cu X-ray image of Fe—Cu system sintered bearing member in the embodiment of the magnetic fluid bearing unit according to the present invention.

FIG. 3 is a schematic view showing a cross-sectional Cu X-ray image of a Fe—Cu system sintered bearing member representing an embodiment of the magnetic fluid bearing unit according to the present invention. According to this X-ray image, a surface layer of each of the two upper and lower radial porous oil-containing sintered bearing members 3a and 3b is almost covered by copper (or copper alloy) 15 having a superior lubrication characteristic. Further, an interior portion of each of the two bearing members 3a and 3b is constituted by an organization where a Cu component intervenes at the particle boundaries of an Fe component.

In particular, it is desirable to cover the surface of each of the two upper and lower radial porous oil-containing sintered bearing members 3a and 3b by Cu (or Cu alloy) 15 which has a superior lubrication characteristic. Thus, each of the two upper and lower bearing members 3a and 3b employs foil like Cu powders as Cu material, and further employs particle powders such as Fe etc. materials, and these powders are sintered to form the sintered bearing members 3a and 3b.

As shown in FIG. 3, in this embodiment of the magnetic fluid bearing unit, each of the two upper and lower radial porous oil-containing sintered bearing members 3a and 3b comprises a Fe—Cu system sintered metal member. As a result, the surface layer of the sliding face of each of the two bearing members 3a and 3b is substantially covered by Cu or a Cu alloy.

Table 1 shows one example of the chemical components of Fe—Cu system sintered bearing members 3a and 3b representing an embodiment of the magnetic fluid bearing unit according to the present invention. In the components of a Fe—Cu system sintered bearing member, since the Fe component represents a permeability material and forms magnetic paths, the magnetic fluid 6 impregnated in the sintered bearing members 3a and 3b is effectively magnetized. Further, a Cu—Sn alloy has a good wetness property and a Cu—P alloy for has a solid lubrication property, and sintered bearing members 3a and 3b having a good ability to withstand friction and a good anti-abrasion characteristic can be attained.

TABLE 1

| Component | Cu    | Sn  | P       | C   | others | Fe      |
|-----------|-------|-----|---------|-----|--------|---------|
| wt %      | 50–55 | 1–3 | 0.1–0.5 | <1  | <0.5   | balance |

Figure 4:
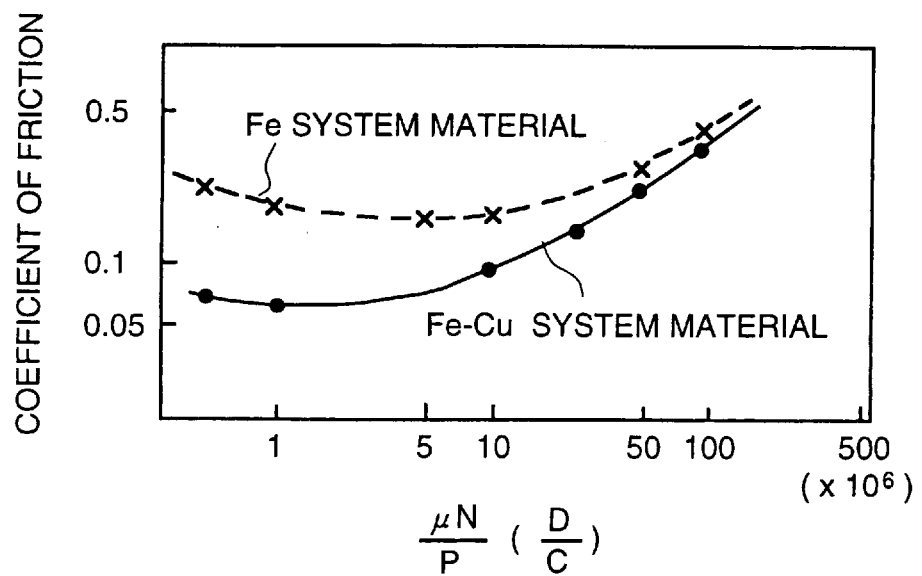
FIG. 4 is a characteristic diagram showing a relationship between the bearing characteristic number and the coefficient of friction between a Fe—Cu system sintered bearing member used for the magnetic fluid bearing unit and a Fe system sintered bearing member used for the magnetic fluid bearing unit according to the present invention.

FIG. 4 is characteristic diagram providing a comparison of the relationship of the bearing characteristic number to the coefficient of friction between a Fe—Cu system sintered bearing member used for the magnetic fluid bearing unit according to the present invention and a Fe system sintered bearing member used for the magnetic fluid bearing unit according to the present invention. The horizontal axis represents the bearing characteristic number ($\eta N(D/C)/P$: where $\eta$: viscosity, N: speed of rotation, P: surface pressure, D: shaft diameter, C: bearing gap), and the vertical axis represents the coefficient of friction. In FIG. 4, the friction coefficient of the Fe—Cu system sintered bearing member used for the magnetic fluid bearing unit according to the present invention is compared with the friction coefficient of the Fe system material used for the magnetic fluid bearing unit according to present invention.

At the region where the bearing characteristic number is less than 100, a mixed lubrication including fluid lubrication and solid contact exists. As a result, in this region the characteristic of the bearing member material remarkably appears. As clearly understood from FIG. 4, the friction characteristic is compared under the same conditions of bearing dimensions, viscosity and speed of rotation. At a region where the bearing load is big, for example in a range where the bearing characteristic number is 1–10, the Fe—Cu system sintered bearing material according to the present invention clearly shows a lower value than the Fe system sintered bearing material according to the present invention. Further, with the Fe—Cu system sintered bearing material according to the present invention, the abrasion can be remarkably reduced.

According to the embodiment of the magnetic fluid bearing unit according to the present invention, by the combination of a new bearing unit structure and the above stated bearing member material, a good lubrication can be attained.

In a VTR cylinder motor, the load is represented by a cylinder 13, however in the case of the polygon mirror motor, a polygon mirror becomes the load, and in case of magnetic disc drive spindle motor, a magnetic disc becomes the load. Accordingly, in the cases of the polygon mirror motor and the magnetic disc drive spindle motor, the motor has basically the same construction as the above described VTR cylinder motor, and so the magnetic fluid bearing structure according to the present invention can be employed in each case.

In each VTR cylinder motor, polygon mirror motor, and magnetic disc drive spindle motor, a high accuracy of rotation is required. This is provided by the magnetic fluid bearing unit according to the present invention, wherein it is possible to ensure a reliable supply and retention of the magnetic fluid at the sliding surface of the bearing member. Further, by employing a dynamic sliding bearing apparatus (not shown) comprised of a three lobe-shaped members in the magnetic fluid bearing unit, a further increase in the accuracy of rotation can be obtained.

Another embodiment of a magnetic fluid bearing unit structure according to the present invention will be explained.

In this second embodiment of the magnetic fluid bearing unit structure, in place of the fixed shaft 1 provided in the above stated first embodiment, a rotative shaft is employed, and in place of the rotative bearing housing 2, a fixed or non-rotative bearing housing is employed. Further, in this second embodiment, the cylinder 13, serving as the load, is mounted on an outer peripheral portion of the rotative motor housing 14 and the rotor 10 also is mounted on a side of the rotative motor housing 14. Thus, the cylinder 13 and the rotor 10 become parts of the rotary body. The stator 8 and the armature windings 9 are mounted on a side of the fixed or non-rotative bearing housing 2. Further, the rotative shaft also is part of the rotary body, however the fixed bearing housing does not rotate.

A further embodiment of a magnetic fluid bearing unit structure according to the present invention will be explained.

In this further embodiment, the above stated first embodiment of the magnetic fluid bearing unit structure a lateral layout type motor. In the lateral layout type motor structure, the vertical type motor structure shown in FIG. 1 is arranged on its side to face toward the left direction. In other words, the components of this lateral layout type motor structure forming the third embodiment according to the present invention are the same components as in the vertical type motor structure shown in FIG. 1.

According to the present invention, the magnetic fluid impregnated in the radial porous oil-containing sintered bearing member, which is sandwiched by the ring-like permanent magnets having their magnetic pole direction oriented in the same direction, is reliably retained in the radial porous oil-containing sintered bearing member, so that the magnetic fluid is effectively supplied to the sliding surface of the bearing member. As a result, reliable lubrication of the magnetic fluid bearing unit can be performed over wide range of rotation speeds from a high speed to a low speed.

Further, the magnetic pole direction of the permanent magnet is set such that a superior sealing property in the magnetic fluid bearing unit structure can be obtained. Also, as the porous oil-containing sintered bearing member of the magnetic fluid bearing unit structure according to the present invention, a bearing member of the Fe—Cu system having a low friction of coefficient is employed. As a result, during starting and stopping and during a high load operation of the motor, a superior withstanding friction property in the magnetic fluid bearing unit structure can be obtained.

Further, by combining the new magnetic fluid bearing structure according to the present invention and the appropriate sintered bearing member material, a magnetic fluid bearing unit having an even more superior lubrication characteristic can be provided.

The above stated magnetic fluid bearing unit structure is suitable for use in a compact size motor, such as employed in an office automation machine and similar apparatus, and a video apparatus where oil leakage and oil scattering can not be tolerated. Therefore, a motor having a stability during a long period of use and a high accuracy can be provided.

We claim:

1. A magnetic fluid bearing unit comprising:

a non-magnetic bearing housing;

a radial sliding bearing member mounted on said non-magnetic bearing housing and having magnetic fluid as a lubricating agent, said radial sliding bearing member being arranged inside said non-magnetic bearing housing;

a rotary body rotatively supported by said radial sliding bearing member;

a first ring-like permanent magnet arranged inside said non-magnetic bearing housing;

a second ring-like permanent magnet arranged inside said non-magnetic bearing housing, said radial sliding bearing member being sandwiched by said first ring-like permanent magnet and said second ring-like permanent magnet;

each of said first ring-like permanent magnet, said radial sliding bearing member and said second ring-like permanent magnet being arranged at an inner peripheral surface of said rotary body; wherein said radial sliding bearing member is a radial porous oil-containing sintered bearing member in which the magnetic fluid is impregnated;

said first ring-like permanent magnet is set to have one direction of magnetic pole orientation; and said second ring-like permanent magnet is set to have the same direction of magnetic pole orientation as said first ring-like permanent magnet;

whereby said first ring-like permanent magnet and said second ring-like permanent magnet operate to retain the magnetic fluid in said radial porous oil-containing sintered bearing member and in a space which is formed between an inner peripheral surface of said radial porous oil-containing sintered bearing member and said inner peripheral surface of said rotary body.

2. A magnetic fluid bearing unit according to claim 1, wherein said radial porous oil-containing sintered bearing member comprises a material selected from a Fe system sintered metal and a Fe—Cu system sintered metal.

3. A magnetic fluid bearing unit according to claim 1, wherein said radial porous oil-containing sintered bearing member comprises a Fe—Cu system sintered metal member, and a surface layer of a sliding face of said radial porous oil-containing sintered bearing member is substantially covered by Cu or Cu alloy.

4. A magnetic fluid bearing unit comprising:

a non-magnetic bearing housing;

a first radial sliding bearing member mounted on said non-magnetic bearing housing and having a magnetic fluid as lubricating agent, said first radial sliding bearing member being arranged inside said non-magnetic bearing housing;

a second radial sliding bearing member mounted on said non-magnetic bearing housing and having a magnetic fluid as lubricating agent, said second radial sliding bearing member being arranged inside said non-magnetic bearing housing;

a rotary body rotatively supported by said first radial sliding bearing member and said second radial sliding bearing member;

a first ring-like permanent magnet arranged in said non-magnetic bearing housing;

a second ring-like permanent magnet arranged in said non-magnetic bearing housing;

a third ring-like permanent magnet arranged in said non-magnetic bearing housing; wherein said first radial sliding bearing member is sandwiched by said first ring-like permanent magnet and said second ring-like permanent magnet;

said second radial sliding bearing member is sandwiched by said second ring-like permanent magnet and said third ring-like permanent magnet;

each of said first ring-like permanent magnet, said first radial sliding bearing member, said second ring-like permanent magnet, said second radial sliding bearing member, and said third ring-like permanent magnetic is arranged at an inner peripheral surface of said rotary body;

said first radial sliding bearing member is a first radial porous oil-containing sintered bearing member in which the magnetic fluid is impregnated;

said second radial sliding bearing member is a second radial porous oil-containing sintered bearing member in which the magnetic fluid is impregnated;

said first ring-like permanent magnet is set to have one direction of magnetic pole orientation, said second ring-like permanent magnet is set to have the same direction of magnetic pole orientation as said first ring-like permanent magnet, and said third ring-like permanent magnet is set to have the same direction of magnetic pole orientation as said first ring-like permanent magnet;

whereby said first ring-like permanent magnet and said second ring-like permanent magnet operate to retain the magnetic fluid in said first radial porous oil-containing sintered bearing member and in a space which is formed between an inner peripheral surface of said first radial porous oil-containing sintered bearing member and said inner peripheral surface of said rotary body, and said second ring-like permanent magnet and said third ring-like permanent magnet operate to retain the magnetic fluid in said second radial porous oil-containing sintered bearing member and in a space which is formed between an inner peripheral surface of said second radial porous oil-containing sintered bearing member and said inner peripheral surface of said rotary body.

5. A magnetic fluid bearing unit according to claim 4, wherein said first radial porous oil-containing sintered bearing member comprises a material selected from a Fe system sintered metal and a Fe—Cu system sintered metal, and said second radial porous oil-containing sintered bearing member comprises a material selected from a Fe system sintered metal and a Fe—Cu system sintered metal.

6. A magnetic fluid bearing unit according to claim 4, wherein each of said first radial porous oil-containing sintered bearing member and said second radial porous oil-containing sintered bearing member comprises a Fe—Cu system sintered metal member, and a surface layer of a sliding face of each of said first radial porous oil-containing sintered bearing member and said second radial porous oil-containing sintered bearing member is substantially covered by Cu or Cu alloy.

7. A motor having a magnetic fluid bearing unit comprising:

a motor housing;

a stator mounted on said motor housing;

a permeable fixed shaft mounted on said motor housing;

a non-magnetic bearing housing;

a rotor mounted on said non-magnetic bearing housing;

a radial sliding bearing member mounted on said non-magnetic bearing housing and having magnetic fluid as a lubricating agent, said radial sliding bearing member being arranged inside said non-magnetic bearing housing surrounding said permeable fixed shaft;

a rotary body rotatively supported by said radial sliding bearing member;

a first ring-like permanent magnet arranged inside said non-magnetic bearing housing surrounding said permeable fixed shaft;

a second ring-like permanent magnet arranged inside said non-magnetic bearing housing surrounding said permeable fixed shaft;

said radial sliding bearing member being sandwiched by said first ring-like permanent magnet and said second ring-like permanent magnet;

each of said first ring-like permanent magnet, said radial sliding bearing member and said second ring-like permanent magnet being arranged at an inner peripheral surface of said rotary body; wherein said radial sliding bearing member is a radial porous oil-containing sintered bearing member in which magnetic fluid is impregnated;

said first ring-like permanent magnet is set to have one direction of magnetic pole orientation; and said second ring-like permanent magnet is set to have the same direction of magnetic pole orientation as said first ring-like permanent magnet;

whereby said first ring-like permanent magnet and said second ring-like permanent magnet operate to retain the magnetic fluid in said radial porous oil-containing sintered bearing member and in a space which is formed between an inner peripheral surface of said radial porous oil-containing sintered bearing member and said inner peripheral surface of said rotary body.

8. A motor having a magnetic fluid bearing unit according to claim 7, wherein said radial porous oil-containing sintered bearing member comprises one material selected from a Fe system sintered metal and a Fe—Cu system sintered metal.

9. A motor having a magnetic fluid bearing unit according to claim 7, wherein said radial porous oil-containing bearing member comprises a Fe—Cu system sintered metal member, and a surface layer of a sliding face of said radial porous oil-containing sintered bearing member is substantially covered by Cu or Cu alloy.

10. A motor having a magnetic fluid bearing unit according to claim 7, wherein said motor enables driving of at least one of an audio apparatus, a video apparatus, a laser beam printer, a magnetic disc apparatus and an air conditioning apparatus.

11. A motor having a magnetic fluid bearing unit according to claim 7, wherein said motor is at least one of a video tape recorder cylinder motor, a laser scanning polygon mirror motor and a magnetic disc drive spindle motor.

12. A motor having a magnetic fluid bearing unit comprising:

a motor housing;

a stator mounted on said motor housing;

a permeable fixed shaft mounted on said motor housing;

a non-magnetic bearing housing;

a rotor mounted on said non-magnetic bearing housing;

a first radial sliding bearing member mounted on said non-magnetic bearing housing and having a magnetic fluid as lubricating agent, said first radial sliding bearing member being arranged inside said non-magnetic bearing housing surrounding said permeable fixed shaft;

a second radial sliding bearing member mounted on said non-magnetic bearing housing and having a magnetic fluid as lubricating agent, said second radial sliding bearing member being arranged inside said non-magnetic bearing housing surrounding said permeable fixed shaft;

a rotary body rotatively supported by said first radial sliding bearing member and said second radial sliding bearing member;

a first ring-like permanent magnet arranged inside said non-magnetic bearing housing surrounding said permeable fixed shaft;

a second ring-like permanent magnet arranged inside said non-magnetic bearing housing surrounding said permeable fixed shaft, said first radial sliding bearing member being sandwiched by said first ring-like permanent magnet and said second ring-like permanent magnet; and a third ring-like permanent magnet arranged inside said non-magnetic bearing housing surrounding said permeable fixed shaft, said second radial sliding bearing member being sandwiched by said second ring-like permanent magnet and said third ring-like permanent magnet;

each of said first ring-like permanent magnet, said first radial sliding bearing member, said second ring-like permanent magnet, said second radial sliding bearing member, and said third ring-like permanent magnet is arranged at an inner peripheral surface of said rotary body; wherein said first radial sliding bearing member is a first radial porous oil-containing sintered bearing member in which the magnetic fluid is impregnated;

said second radial sliding bearing member is a second radial porous oil-containing sintered bearing member in which the magnetic fluid is impregnated;

said first ring-like permanent magnet is set to have one direction of magnetic pole orientation;

said second ring-like permanent magnet is set to have the same direction of magnetic pole orientation as said first ring-like permanent magnet; and said third ring-like permanent magnet is set to have the same direction of magnetic pole orientation as said first ring-like permanent magnet;

whereby said first ring-like permanent magnet and said second ring-like permanent magnet operate to retain the magnetic fluid in said first radial porous oil-containing sintered bearing member and in a space which is formed between an inner peripheral surface of said first radial porous oil-containing sintered bearing member and said inner peripheral surface of said rotary body, and said second ring-like permanent magnet and said third ring-like permanent magnet operate to retain the magnetic fluid in said second radial porous oil-containing sintered bearing member and in a space which is formed between an inner peripheral surface of said second radial porous oil-containing sintered bearing member and said inner peripheral surface of said rotary body.

13. A motor having a magnetic fluid bearing unit according to claim 12, wherein said first radial porous oil-containing sintered bearing member comprises one material selected from a Fe system sintered metal and a Fe—Cu system sintered metal, and said second radial porous oil-containing sintered bearing member comprises one material selected from a Fe system sintered metal and a Fe—Cu system sintered metal.

14. A motor having a magnetic fluid bearing unit according to claim 12, wherein each of said first radial porous oil-containing sintered bearing member and said second radial porous oil-containing sintered bearing member comprises a Fe—Cu system sintered metal member, and a surface layer of a sliding face of each of said first radial porous oil-containing sintered bearing member and said second radial porous oil-containing sintered bearing member is substantially covered by Cu or Cu alloy.

15. A motor having a magnetic fluid bearing unit according to claim 12, wherein said motor enables driving of at least one of an audio apparatus, a video apparatus, a laser beam printer, a magnetic disc apparatus and an air condition apparatus.

16. A motor having a magnetic fluid bearing unit according to claim 12, wherein said motor is at least one of a video tape recorder cylinder motor, a laser scanning polygon mirror motor and a magnetic disc drive spindle motor.

* * * * *